United States Patent [19]

Le Gourvellec

[11] Patent Number: 5,127,634

[45] Date of Patent: Jul. 7, 1992

[54] HYDROPNEUMATIC VEHICLE SUSPENSION STRUT

[75] Inventor: Francois Le Gourvellec, Rambouillet, France

[73] Assignees: Automobiles Peugeot; Automobiles Citroen, both of France

[21] Appl. No.: 407,114

[22] Filed: Sep. 14, 1989

[30] Foreign Application Priority Data

Sep. 14, 1988 [FR] France .................... 88 11954

[51] Int. Cl.$^5$ ............................. F16F 5/00; F16F 9/48
[52] U.S. Cl. ............................... 267/64.26; 188/289
[58] Field of Search ............... 188/269, 281, 282, 289, 188/314, 322.21, 322.15; 267/35, 64.13, 217, 218, 64.26; 280/708

[56] References Cited

U.S. PATENT DOCUMENTS

| | | | |
|---|---|---|---|
| 3,070,363 | 12/1962 | Ellis | 188/289 X |
| 3,147,826 | 9/1964 | McHenry | 188/289 X |
| 3,944,197 | 3/1976 | Dashicourt | 188/314 X |
| 3,945,626 | 3/1976 | Tilkins | 280/708 X |
| 3,991,863 | 11/1976 | Lee | 188/289 |
| 4,050,684 | 9/1977 | Sanders | 188/289 |
| 4,407,397 | 10/1983 | Fukishima et al. | 188/322.15 X |
| 4,796,732 | 1/1989 | Kong | 188/322.15 X |
| 4,834,222 | 5/1989 | Kato et al. | 188/322.15 X |
| 4,921,224 | 5/1990 | Fukumura et al. | 188/314 X |

FOREIGN PATENT DOCUMENTS

| | | | |
|---|---|---|---|
| 1052624 | 1/1954 | France | 188/289 |
| 2079874 | 11/1971 | France | |
| 58-8840 | 1/1983 | Japan | |
| 0030621 | 2/1988 | Japan | 188/289 |
| 398350 | 9/1933 | United Kingdom | |
| 2027160 | 2/1980 | United Kingdom | |

*Primary Examiner*—Robert J. Oberleitner
*Attorney, Agent, or Firm*—Wong & Husar

[57] ABSTRACT

A hydropneumatic suspension strut adapted to be connected between the chassis and a wheel of an automotive vehicle. The strut has a piston with a rod having an axial passage connected to a hydropneumatic accumulator, and slides in a cylinder. A hydraulic stop arrests the movement of the piston at the end of its inward or driving stroke. The hydraulic driving stop includes, fixed to the end of the cylinder, a pin for entering an axial opening in a moving valve contained in an interior recess of the piston in such a manner that there is progressive restriction of the flow of hydraulic fluid through the valve, to cushion and stop the piston.

4 Claims, 2 Drawing Sheets

HYDROPNEUMATIC VEHICLE SUSPENSION STRUT

This invention relates to a hydropneumatic vehicle suspension strut particularly for automobiles, and of the type which comprises, a cylinder pivoted to a support arm of a wheel, a piston which slides in the cylinder and is articulated to the structure of the vehicle, the piston having a rod with an axial passage connected hydraulically to a hydropneumatic accumulator, preferable of the membrane type.

BACKGROUND OF THE INVENTION

Support struts or cylinders of the type defined above are generally equipped with an extension stop, and drive or compression stop, which are hydraulic or elastomeric, intended to limit in one direction or the other, the displacement of the piston and to cushion or absorb the displacement at the end of the stroke.

It has been proposed in the Assignees French Application 87.17520 published Jun. 16, 1989 to use hydraulic compression and extension stops comprising means for progressively restricting the escape of hydraulic fluid during the displacement of the piston at the end of the stroke. These means should be defined in such a way that after a compression or extension stroke, the return of the piston to its mean or center position takes place rapidly without having to overcome an antagonistic or resisting force of the stop. This leads to technological complications in making the stop.

SUMMARY OF THE INVENTION

The invention has for an object, a hydropneumatic suspension strut having a simplified hydraulic compression or driving stroke stop, adapted to progressively absorb the end of the inward driving stroke of the piston and not exert any antagonistic force during the extension stroke return of the piston to the mean or center position.

The strut which is the object of the invention is characterized by the fact that the hydraulic driving stop comprises, fixed to the end of the cylinder, a pin for engaging a floating or moving valve in an interior recess of the piston in such a manner that there is progressive restriction of the flow of hydraulic fluid toward the accumulator.

According to another characteristic, the floating valve comprises, by its displacement in the recess, the means for allowing the return of the piston to its mean or center position without exerting any opposing force.

According to another characteristic, the piston has an axial opening communicating the axial passage of the rod with a lower axial bore of the piston, this bore having an upper shoulder and containing the floating valve which can move between the shoulder of the bore and a stop ring seated in the side wall of bore.

Advantageously, the floating valve is comprised of a disk having a plurality of peripheral notches and an axial opening, and its outer diameter is close to the diameter of the bore in the piston so it is centered by the side wall of the bore. The valve has on its upper face, between its axial opening and its peripheral notches, a circular or annular seat to engage and seal against the shoulder of the piston.

Other characteristics and advantages of the invention will become apparent from the detailed description which follows and the drawings given as non-limiting example.

DETAILED DESCRIPTION OF PREFERRED EMBODIMENT

Figure 1:
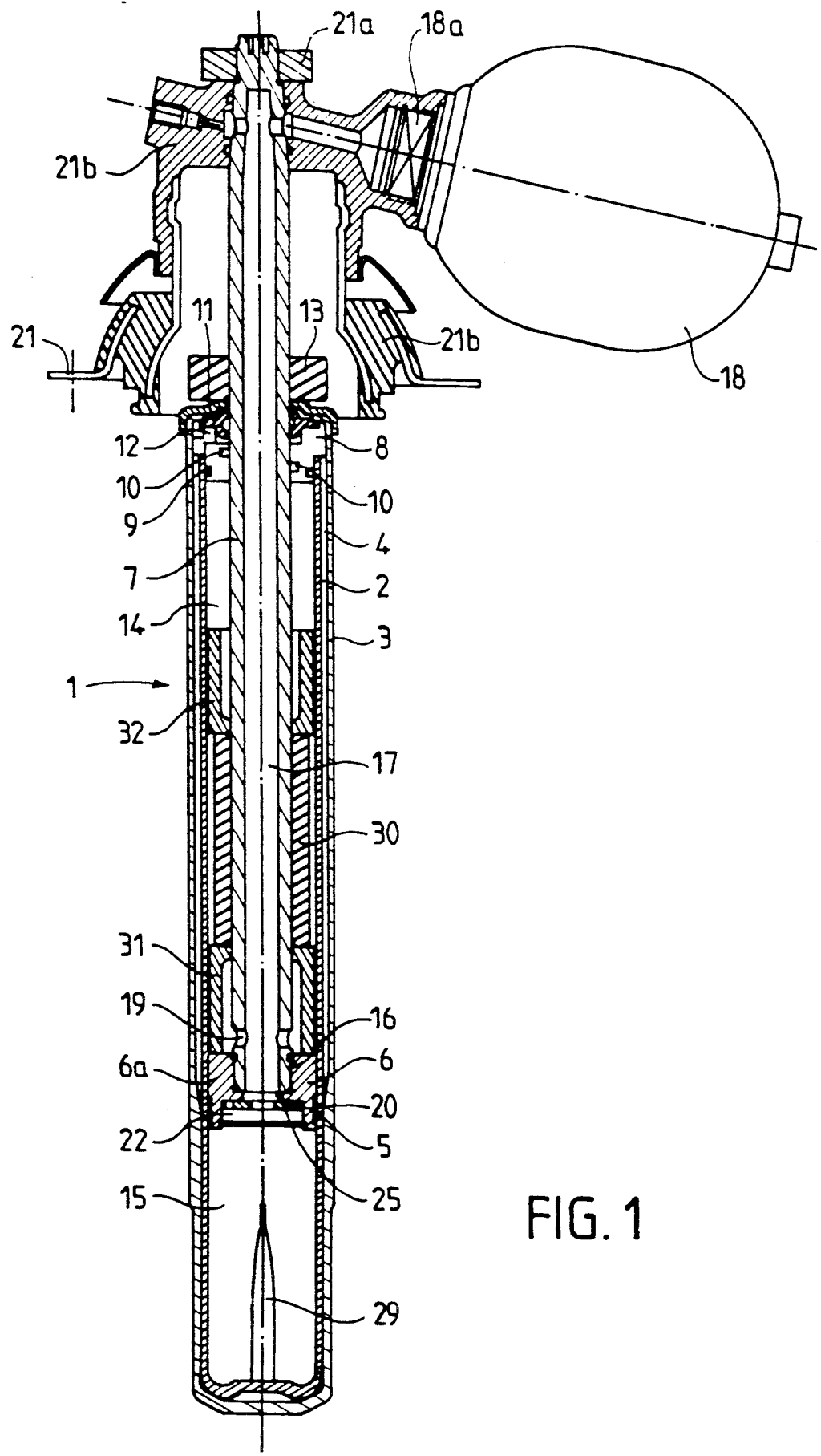
FIG. 1 is a view in axial section of a suspension strut according to the invention.

With reference to the drawings, particularly FIG. 1, there is shown a suspension strut 1 comprised of a cylinder 2 within a protective wall 3 which defines with the cylinder 2, an annular chamber 4.

A piston 6 having a seal 5 slides in the cylinder 2. Piston 6 has a lower bearing or head 6a which slides in cylinder 2, and a rod 7 which slides in an upper bearing 8 secured to the cylinder 2.

The upper bearing 8 is sealed to the cylinder 2 by an O-ring 9, while the rod 7 of the piston is sealed relative to the upper bearing 8 by an inclined seal 10 at the inside of the bearing, and a wiper seal 11 above the bearing 8. Hydraulic fluid which leaks during movement of the upper bearing is directed by an opening 12 of the bearing 8 into the annular chamber 4, and returns to the reservoir through a connection which is not shown. An elastic stop bushing 13 is mounted on top of the protective wall or envelope 3 of the cylinder 2.

The piston 6 divides the cylinder 2 into a first or upper chamber 14 containing the rod 7 of the piston, and a second or lower chamber 15 below the piston 6.

The lower bearing 6a of the piston is secured to the rod 7 by a screw thread 16, and the rod 7 has an axial passage 17 connected hydraulically to a hydropneumatic accumulator 18 through a hydraulic damper 18a. The passage 17 communicates through lateral openings 19 with the chamber 14 above the piston, and through axial opening 20 of head 6a of the piston, with the lower chamber 15.

The rod 7 of the piston is secured by a nut 21a to an elastic support 21b, which is secured to the hydropneumatic accumulator 18 and the chassis of the vehicle. The cylinder 2 and its protective envelope 3 are secured to a pivot connection on a wheel of the vehicle, as is well known.

Figure 3:
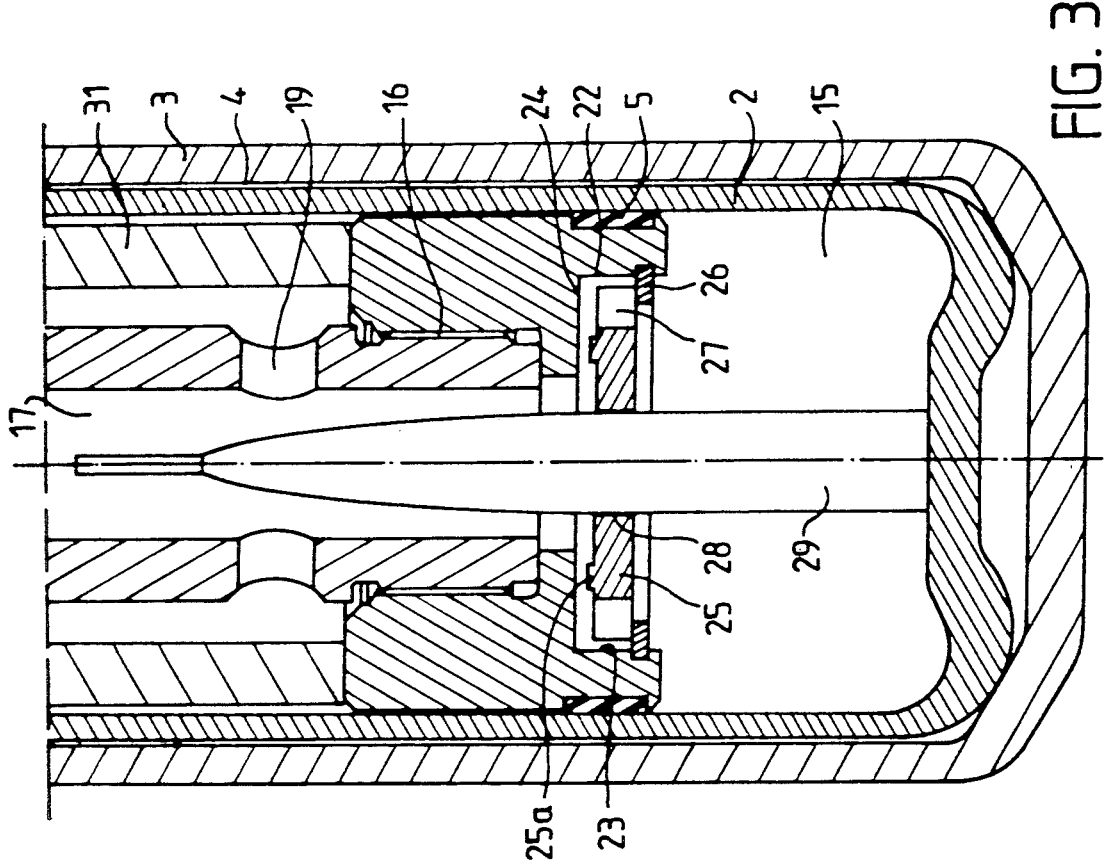
FIG. 3 is a partial enlarged view of the strut showing the action just after the piston reverses direction and begins an extension stroke from the condition of FIG. 2.
Figure 2:
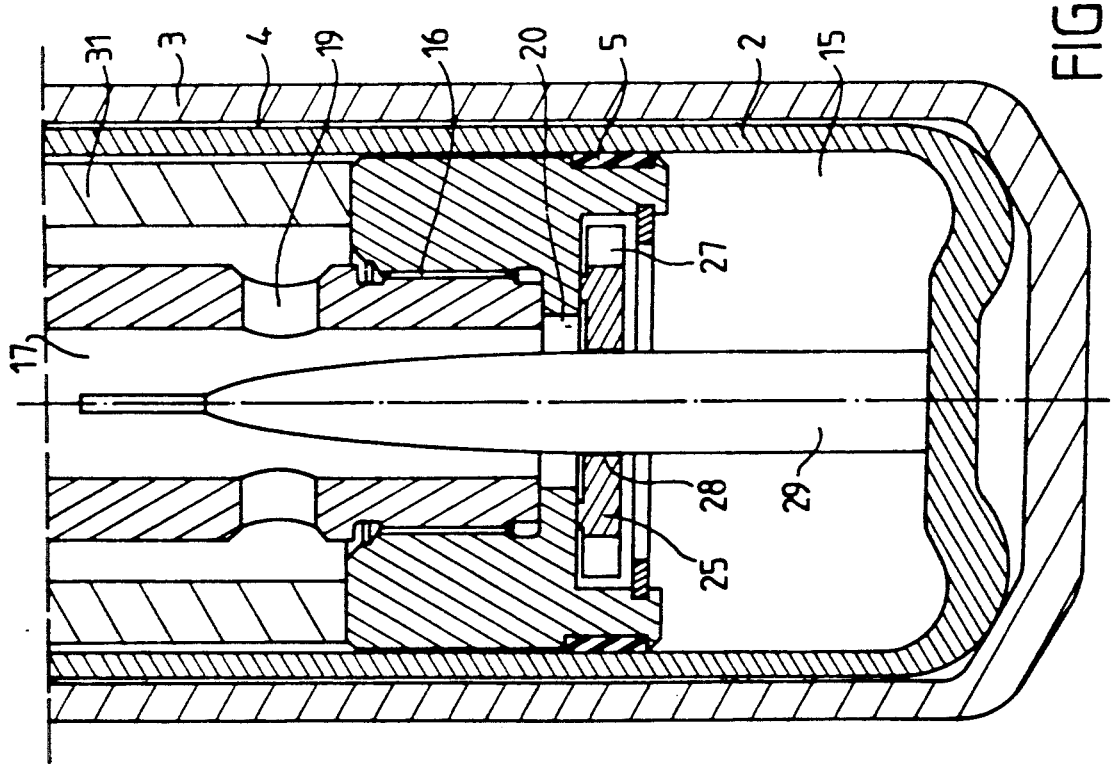
FIG. 2 is a partial enlarged view of the lower end of the strut showing its action at the end of a compression or driving stroke.

The piston 6 has, at the end opposite to the rod 7 (FIGS. 2 and 3) a recess 22 composed of a cylindrical bore 23 which is open on the side facing toward chamber 15 and has an upper shoulder 24. This recess 22 communicates hydraulically with the axial passage 17 of the piston rod through the opening 20 above shoulder 24.

A floating or displaceable valve 25 can move in the chamber 22 between shoulder 24 and a stop ring 26 spaced from and below the shoulder and seated in a groove of the bore 23. The floating valve 25 takes the form of a disk centered by the side wall of bore 23, and has a plurality of peripheral grooves or notches 27. Valve 25 has a central axial opening 28 smaller than the opening 20 of the piston 6. It can also be seen from FIGS. 2 and 3 that the inner diameter of the notches is less than the inner diameter of the stop ring 26, and that the opening 20 of the piston is somewhat smaller than the inner diameter of the notches 27.

The floating valve 25 has on its upper face, for sealing against the shoulder 24 of the piston, an annular region in the form of a seat 25a of an outer diameter less than the inner diameter of the notches 27 and an inner diameter greater than the diameter of opening 20.

Thus, when the floating valve 25 seats on the shoulder 24, during a compression stroke of the piston, the hydraulic fluid cannot flow from lower chamber 15 to the passage 17, except through the opening 28. When the floating valve is in an intermediate position, or in contact with the stop ring 26, the hydraulic fluid can flow through both the notches 27 and the opening 28.

At the bottom of the cylinder 2 is a fixed needle or pin 29 in the form of a body of revolution, having a profile suitable for damping or absorbing the end of the driving stroke. The pin 29 is of a maximum diameter, in its useful portion, which is much smaller than the opening 20 of the piston and can engage in the opening 28 of the floating valve 25 to throttle or restrict fluid flow from chamber 15 to accumulator 18. It thus constitutes a driving or compression stroke stop.

When the piston 6 is forced into the cylinder 2 during a driving stroke, the floating valve 25 seats on the shoulder 24 and the fluid flows from chamber 15 to the accumulator by passing through the opening 28. When at the end of the stroke (FIG. 2), the opening 28 engages over the body of pin 29, the flow of fluid is restricted or throttled, and the stroke of the piston is damped and cushioned. The elastic stop 13 finishes the damping of the driving stroke of the piston.

When, after a driving stroke, the piston returns toward its mean or center position, the valve 25 releases from the shoulder 24 and the fluid in upper chamber 14 can flow into lower chamber 15 by passing through the passage 17, the opening 20, and the notches 27. During this time the valve 25 rests on the stop ring 26. Correspondingly, just after a full inward stroke (FIG. 2), when the piston begins its return stroke (FIG. 3), there is no severe restraining of the return motion because of the action of valve 25, even though pin 29 is still in opening 28 of the valve.

The strut 1 has in addition to its hydraulic driving stroke stop, an annular extension stroke stop 30 of known elastomer disposed in cylinder 2 between two stop supports 31 and 32. Supports 31 and 32 have smooth end faces which allow these supports to rotate on the smooth ends of the respective bearings 8 and 6a. If in the course of turning, the cylinder 2 rotates relative to the piston 6, while the extension stop 30 is compressed, the supports 31 and 32 can slide in rotation on the bearings 6 and 8 and the extension stop 30 is not subjected to torsion or abrasion.

The strut with the hydraulic drive stroke stop as described above, provides a very simple solution for the return of the piston and cylinder to the mean or center position after a driving stroke, without opposition by an opposing hydraulic force. The simple configuration of the pin facilitates adapting its profile to the law of damping appropriate at the end of the drive stroke.

While a preferred embodiment has been shown and described, changes and variations can be made without departing from the scope of the invention.

I claim:

1. A hydropneumatic suspension strut of an automotive vehicle comprising, a cylinder adapted to be connected to a wheel of the vehicle, a piston slidable in the cylinder and having a rod adapted to connected to the structure of the vehicle, said rod having an axial passage for communication with a hydropneumatic accumulator, hydraulic driving stroke stop means within said cylinder for stopping the piston adjacent the end of an inward driving stroke of the piston, said hydraulic driving stroke stop means comprising, a pin secured to said cylinder and adjacent an end of the cylinder a moveable valve retained in a recess of the piston, said valve having an axial opening, said opening in said valve and said pin cooperating to progressively restrict flow of hydraulic fluid to the accumulator as the piston approaches the end of an inward stroke into the cylinder, and wherein, said piston has an axial opening communicating the passage in said piston rod with said recess containing said valve, said recess of the piston comprises a downwardly opening bore having a shoulder at its upper end and engagable with a seat on the upper surface of said valve so that said valve can move between said shoulder and said stop means during extension of the piston to allow extension with minimal constraint.

2. A strut according to claim 1 wherein said valve comprises, a disk having a plurality of peripheral notches, and wherein said axial opening of the valve is formed in said disk, and said disk is maintained centered by the side wall of said bore of the recess in the piston.

3. A strut according to claim 2 wherein said valve comprises, an annular seal region on its upper surface, between said notches and said axial opening, for engaging and sealing against said shoulder.

4. A strut according to claim 3 wherein said pin comprises a body of revolution for restricting the flow of fluid toward the accumulator, said pin having a maximum diameter in the operating portion thereof which is smaller than the diameter of the axial opening in the piston.

* * * * *